United States Patent [19]

Wook et al.

[11] Patent Number: 4,843,470
[45] Date of Patent: Jun. 27, 1989

[54] INTEGRATED SYNCHRONIZING SIGNAL SEPARATING CIRCUIT FOR GENERATING A BURST GATE PULSE

[75] Inventors: Jang Y. Wook, Seoul; Kim Y. Saeng, Buchon; C. Shin Myung, Seoul, all of Rep. of Korea

[73] Assignee: Samsung Electronics Co., Ltd., Suwon, Rep. of Korea

[21] Appl. No.: 196,246

[22] Filed: May 20, 1988

[30] Foreign Application Priority Data

May 23, 1987 [KR] Rep. of Korea ............... 1987/5178

[51] Int. Cl.$^4$ .................. H04N 5/08; H04N 9/455
[52] U.S. Cl. ............................ 358/153; 358/20; 358/148
[58] Field of Search .............. 358/19, 20, 148, 150, 358/153, 154

[56] References Cited

U.S. PATENT DOCUMENTS

| | | | |
|---|---|---|---|
| 3,135,826 | 6/1964 | Moles et al. | 358/20 |
| 4,202,012 | 5/1980 | Hirashima | 358/20 |
| 4,263,610 | 4/1981 | Shanley, II et al. | 358/20 |
| 4,491,870 | 1/1985 | Aschwanden | 358/153 |
| 4,707,730 | 11/1987 | Alard | 358/153 |
| 4,707,740 | 11/1987 | Stratton | 358/153 |

Primary Examiner—James J. Groody
Assistant Examiner—Michael D. Parker
Attorney, Agent, or Firm—Robert E. Bushnell

[57] ABSTRACT

An integrated circuit for improved burst gate pulse separation for use in a digital video system that receives a positive composite video signal wherein horizontal, vertical and composite synchronizing signals and a burst gate pulse signal are respectively separated therefrom. Said circuit comprises horizontal synchronizing output means for receiving a horizontal synchronizing signal from horizontal synchronizing separation means and a compensated output of horizontal synchronizing delay compensation means and therefrom supplying the horizontal synchronizing signal having a specified level, vertical synchronizing output means for receiving a vertical synchronizing signal and therefrom supplying the vertical synchronizing signal having a specified level, composite synchronizing output means for supplying a composite synchronizing signal having a specified level by composing the vertical synchronizing signal and the compensated horizontal synchronizing signal, and burst gate pulse generating means for providing a burst gate pulse by inverting and then clamping the horizontal synchronizing signal.

1 Claim, 7 Drawing Sheets

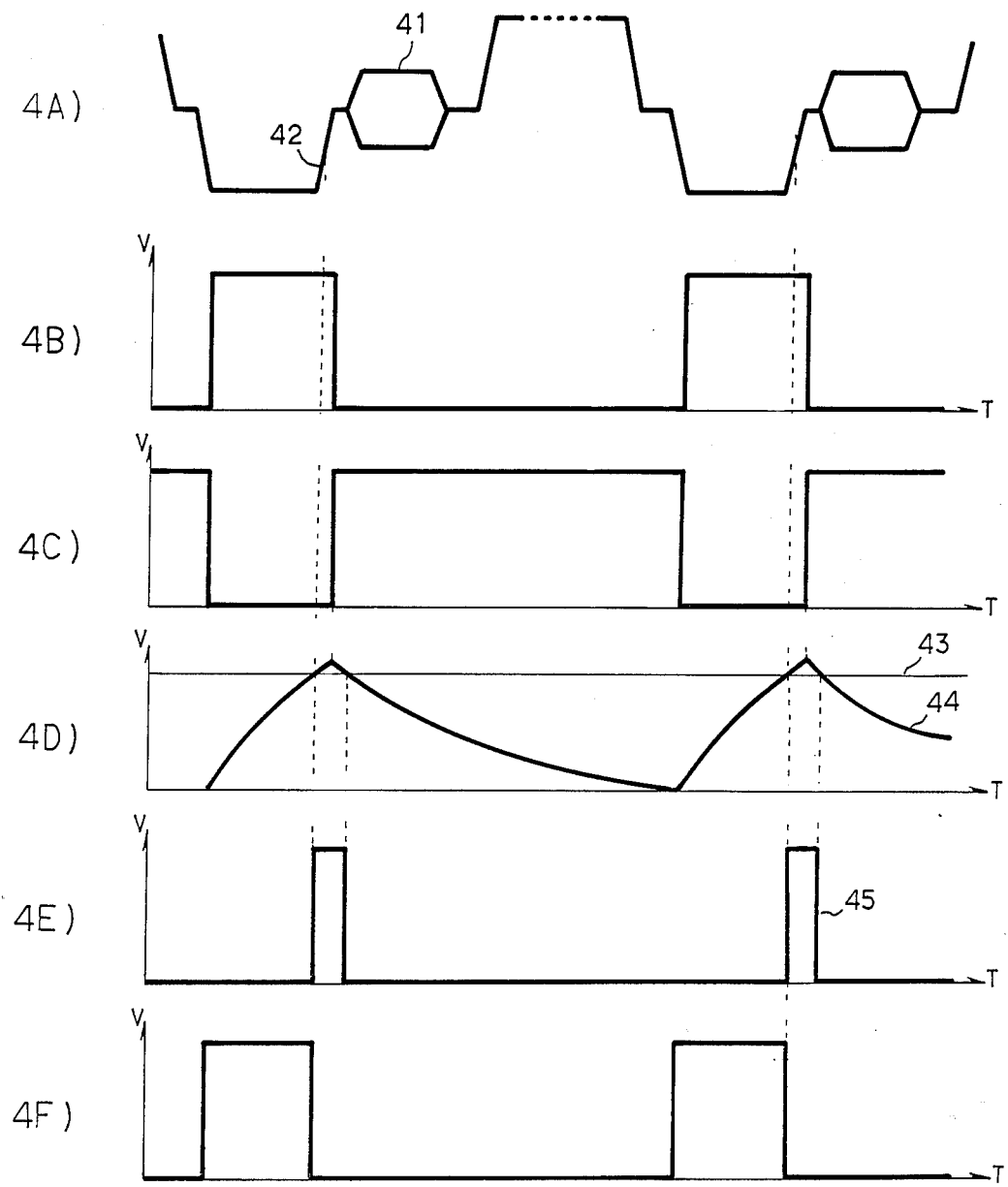
F I G . 4

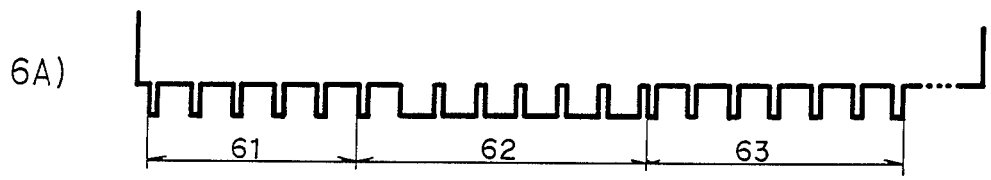
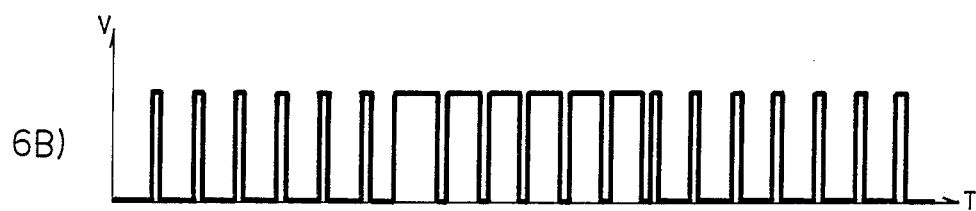
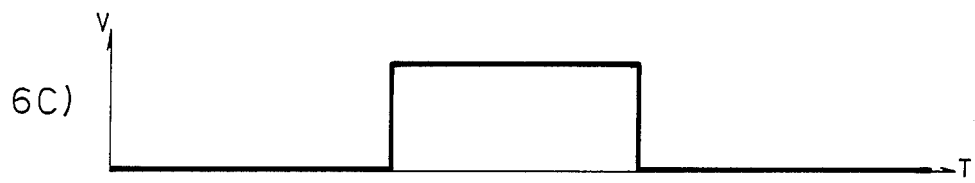
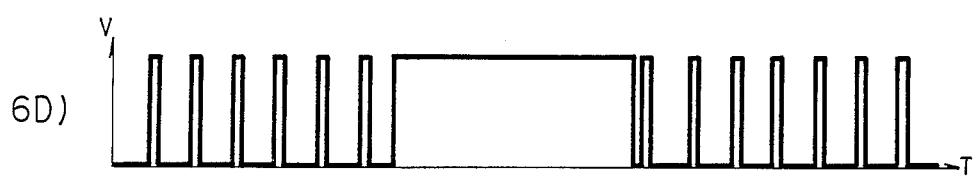
F I G . 6

4,843,470

INTEGRATED SYNCHRONIZING SIGNAL SEPARATING CIRCUIT FOR GENERATING A BURST GATE PULSE

FIELD OF THE INVENTION

The present invention relates to a circuit in a digital video system, and in particular to an integrated synchronizing signal separating circuit which receives a positive composite video signal from an exterior part and generates thereby a horizontal synchronizing signal, a vertical synchronizing signal, a composite synchronizing signal of the horizontal and vertical synchronizing signals, and a burst gate pulse being detected in the burst period of the signal.

BACKGROUND OF THE INVENTION

In a video system that uses a positive composite video signal, there is needed a burst gate pulse which is used in a video phase locked loop (PLL) block, as well as some reference synchronizing signals such as horizontal, vertical and composite synchronizing signals. Therefore, the PLL system requires a local oscillator having its oscillation frequency of 3.58 MHz (In other systems, it may be divided in frequency from 14.32 MHz) which is used as a reference signal for color signals in a receiver of the video system. To coincide a phase of the oscillation frequency with a burst signal of the input composite video signal, it requires a pulse signal to inform a position of the burst signal. The pulse signal is referred to as the burst gate pulse signal.

The video system of prior art has been equipped with an exterior synchronizing circuit which adopts discrete and operational amplifiers, wherein the phase is made to coincide with the burst signal of the input composite video signal in generating a signal having a frequency and a duty rate same as the burst. Because the exterior circuit consists of several components, it raises the cost in producing the system. Moreover, it becomes very difficult to make the phase coincide with the burst signal of the input composite video signal if another synchronizing circuit is not equipped therewith, and thus the quality of the burst gate pulse becomes to degrade.

SUMMARY OF THE INVENTION

It is therefore an object of the invention to provide a single integrated circuit for outputing a burst gate pulse as well as the reference synchronizing signals comprising the horizontal and vertical synchronizing signals and the composite synchronizing signal in a video system, wherein the area of the printed circuit board (PCB) of the system can be effectively reduced and the work hours in manufacturing thereof can be saved.

It is a further object of the invention to provide an integrated synchronizing signal separation circuit which can achieve a stabilized video system by means of providing accurate synchronizing signals of high quality therein.

This and other objects of the invention are accomplished by the subject inventive circuit which comprises a first inverter for inverting in phase said composite video signal input, a horizontal synchronizing filter for eliminate a high frequency component from the output of said first inverter that is the inverted composite video signal, a first clamp circuit for clamping the output of said horizontal synchronizing filter to a fixed voltage in order to easily separate a horizontal synchronizing signal therefrom, horizontal synchronizing separation means for separating the horizontal synchronizing signal from the clamped output of said first clamp circuit, horizontal synchronizing delay compensation means for compensating the delay of said clamped output, horizontal synchronizing output means for receiving the horizontal synchronizing signal from said horizontal synchronizing separation means and the compensated output of said horizontal synchronizing delay compensation means, and therefrom supplying the horizontal synchronizing signal having a specified level, a vertical synchronizing filter for eliminating the horizontal synchronizing signal and an equalizing pulse from the clamped output of said first clamp circuit, a comparator for comparing the output of said vertical synchronizing filter with a reference voltage and thereby separating a vertical synchronizing signal, reference voltage generating means for supplying said reference voltage to said comparator, vertical synchronizing output means for receiving said vertical synchronizing signal and therefrom supplying the vertical synchronizing signal having a specified level, composite synchronizing output means for supplying a composite synchronizing signal having a specified level by composing said vertical synchronizing signal of said comparator and the compensated horizontal synchronizing signal, a second inverter for inverting in phase said horizontal synchronizing signal of said horizontal synchronizing output means, a second clamp circuit for clamping the inverted horizontal synchronizing signal of said second inverter to a fixed voltage and burst gate pulse generating means for supplying a burst gate pulse from the clamped horizontal synchronizing signal of said second clamp circuit.

BRIEF DESCRIPTION OF THE DRAWINGS

FIG. 4, A-F are waveform diagrams illustrating aspects of operation in a circuit portion for separating the horizontal synchronizing signal according to the preferred embodiment.

FIG. 6, A-D are waveform diagrams illustrating aspects of operation in a composite synchronizing output circuit for providing the composite signal of the horizontal and vertical synchronizing signals according to the preferred embodiment.

DETAILED DESCRIPTION OF THE INVENTION

One preferred embodiment of the invention is illustrated in the aforementioned drawings. Hereinafter, the invention will be described with reference to those drawings.

Figure 1:
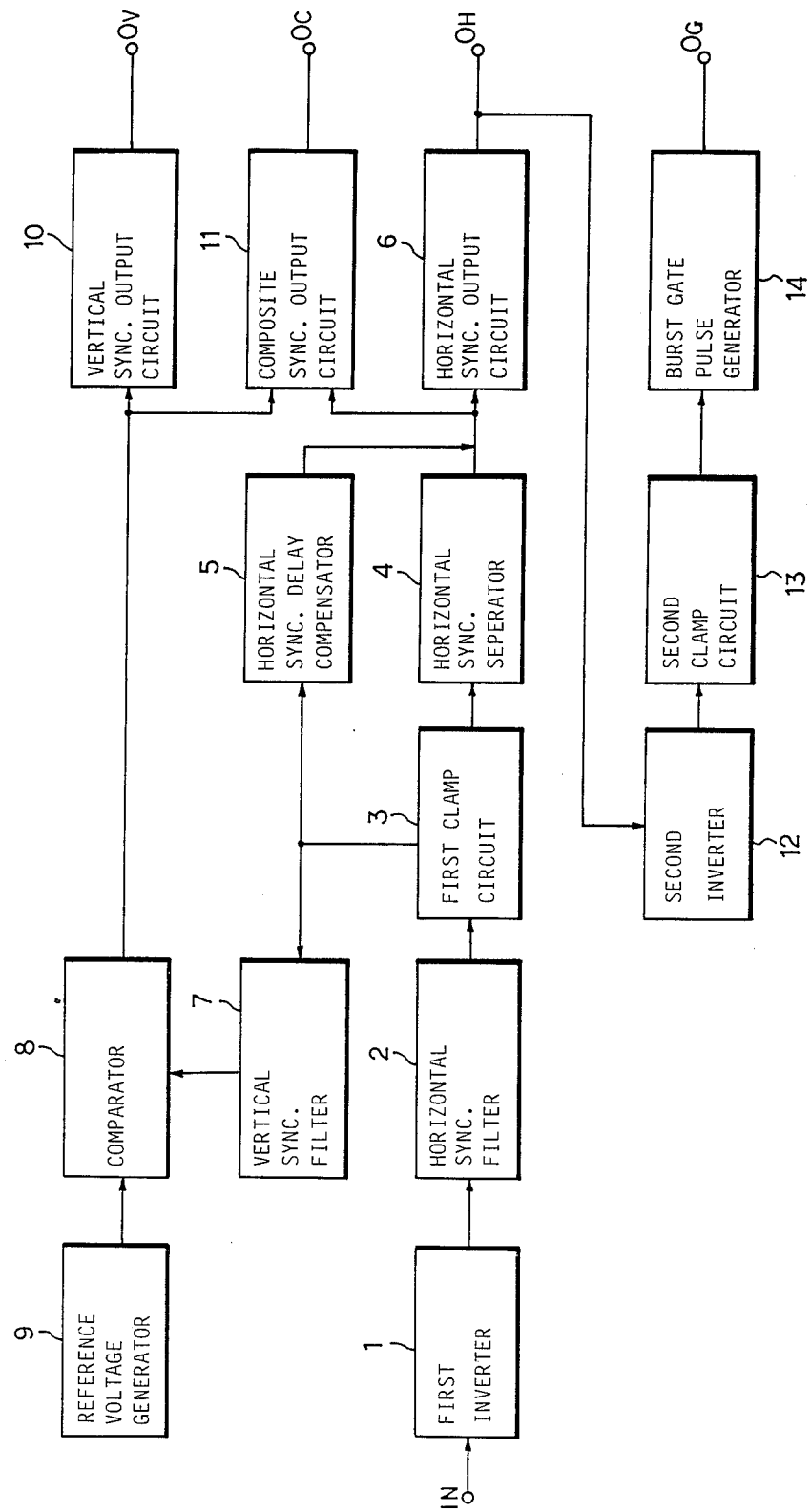
FIG. 1 is a block diagram of the integrated circuit according to the present invention.

FIG. 1 illustrates a block diagram of the integrated circuit according to the invention, wherein said integrated circuit comprises a first inverter 1, a horizontal synchronizing filter 2, a first clamp circuit 3, a horizontal synchronizing separator 4, a horizontal synchronizing delay compensator 5, a horizontal synchronizing output circuit 6, a vertical synchronizing filter 7, a comparator 8, a reference voltage generator 9, a vertical synchronizing output circuit 10, a composite synchronizing output circuit 11, a second inverter 12, a second clamp circuit 13 and a burst gate pulse generator 14. The first inverter 1 inverts an input composite video signal in its phase. The output of the first inverter 1 is got rid of the high frequency component thereof in the horizontal synchronizing (hereinafter, "synchronizing" will be referred to as "SYNC") filter 2. The first clamp circuit 3 clamps the output of the horizontal SYNC filter 2 to separate the horizontal SYNC signal therefrom. The signal clamped in the first clamp circuit 3 enters to the horizontal SYNC separator 4 to have the horizontal SYNC signal be separated therefrom. The horizontal SYNC delay compensator 5 compensates the delay in the signal clamed in the first clamp circuit 3. The horizontal SYNC output circuit 6 provides an adequate level of horizontal SYNC signal which is converted from the output of the horizontal SYNC separator 4 and the compensated horizontal SYNC signal output of the horizontal SYNC delay compensator. The output of the first clamp circuit 3 is got rid of the horizontal SYNC signal and the equalizing pulse in the vertical SYNC filter 7. Then, the output of the vertical SYNC filter 7 is compared with a reference voltage supplied from the reference voltage generator 9, thereby providing the vertical SYNC signal in the comparator 8. The vertical SYNC output circuit 10 provides an adequate level of vertical SYNC signal from the output of the comparator 8. The vertical SYNC signal of the comparator 8 and the compensated horizontal SYNC signal are combined into the composite SYNC signal in the composite SYNC output circuit. The horizontal SYNC output signal of the horizontal SYNC output circuit is inverted in phase in the second inverter 12. The second clamp circuit 13 clamps the inverted horizontal SYNC output to a fixed voltage level. Then, the burst gate pulse generator 14 receives the clamped horizontal SYNC signal and provides the burst gate pulse therefrom.

To further examine the block diagram of FIG. 1, a video signal through an input terminal IN of the composite video signal is inverted in phase in the first inverter 1 and then delivered to the horizontal SYNC filter 2. After removing the high frequency components thereof which is unnecessary for the separation of the horizontal and vertical SYNC signals in the filter 2, the inverted video signal of the filter 2 is fed to the first clamp circuit 3 and clamped therein to a fixed voltage level for easy seperation of SYNC signals. The clamped video signal is delivered to the horizontal SYNC separator 4, the horizontal SYNC delay compensator 5 and the vertical SYNC filter 7, respectively. The horizontal SYNC output circuit receives the horizontal SYNC signal separated through the horizontal SYNC separator 4 and the horizontal SYNC signal compensated for the delaying of signal through the horizontal SYNC delay compensator 5. Thus, the horizontal SYNC output circuit 6 provides the complete horizontal SYNC signal compensated for the delay with transistor-transistor logic (TTL) level at an output terminal $O_H$ of the horizontal SYNC signal.

The horizontal SYNC signal that was compensated for the delay in the horizontal SYNC delay compensator 5 is delivered to the composite SYNC output circuit 11. Then, the positive video signal delivered to the vertical SYNC filter 7 changes therein into an integration voltage that the horizontal SYNC signal and the equalizing pulse are got rid of. The integration voltage output is compared in the comparator 8 with the reference voltage provided by the reference voltage generator 9. The output of the comparator 8, that is, the vertical SYNC signal is delivered to the composite SYNC output circuit 11 and the vertical SYNC output circuit 10, respectively. Thus, the vertical SYNC output circuit 10 provide the vertical SYNC signal with the TTL level of the conventional use at the output terminal Ov thereof. The output of the horizontal SYNC delay compensator 5, that is, the compensated horizontal SYNC signal, and the output of the comparator 8, that is, the vertical SYNC signal are composed into the composite SYNC signal in the composite SYNC output circuit 11 and then the resulting composite SYNC signal outputs to the output terminal Oc. Meanwhile, the output of the horizontal SYNC output circuit 6, which is the signal compensated for the delay in the horizontal SYNC delay compensator 5 (said signal will be referred to only as "horizontal SYNC signal", hereinafter), is inverted in phase in the second inverter 12 and then clamped to a fixed voltage level in the second clamp circuit 13. The clamped reverse-phased horizontal SYNC signal is delivered to the burst gate pulse generator 14, thereby providing a stabilized burst gate pulse of high quality through the output terminal $O_G$.

Figure 2A:
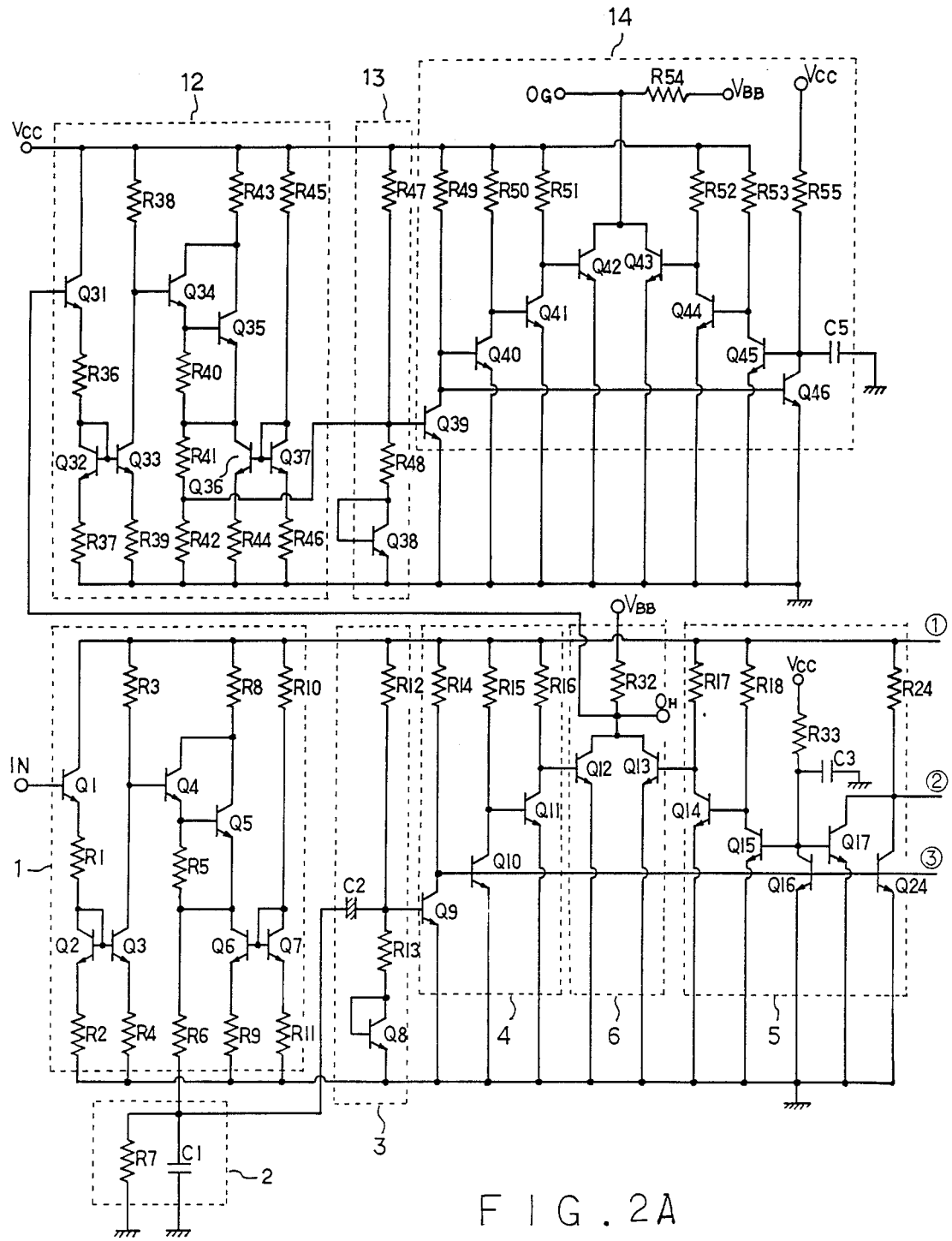
FIG. 2 is an electrically schematic circuit diagram according to a preferred embodiment of the invention.
Figure 2B:
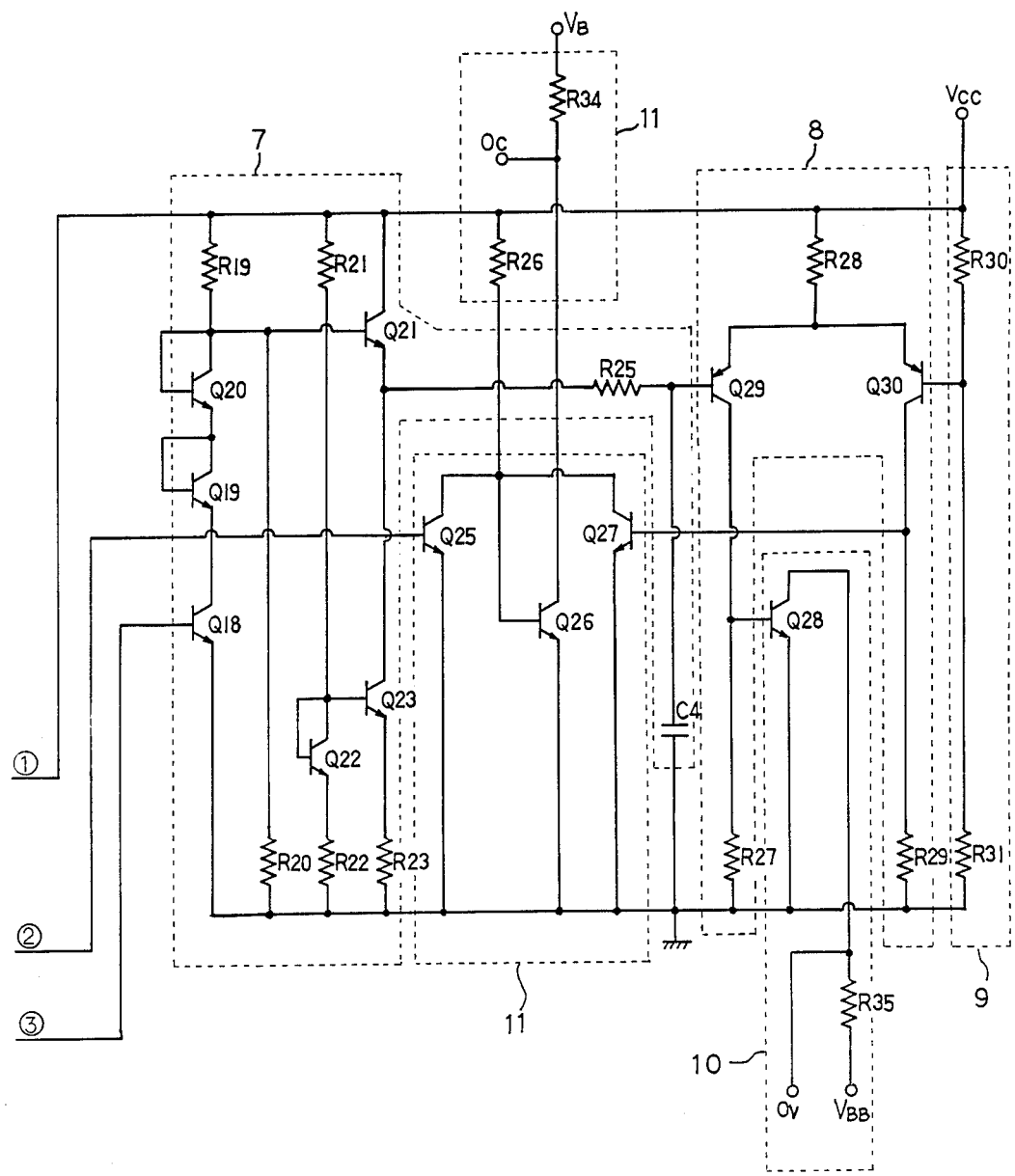

FIG. 2 illustrates an electrically schematic circuit diagram of a preferred embodiment of an integrated SYNC signal separating circuit for generating a burst gate pulse according to the invention. In the drawing aforementioned, reference symbols Q1–Q46 represent transistors, R1–R55 represent resistors, C1–C5 represent capacitors, Vcc represents a source voltage and $V_{BB}$ represent a 5 volts source of the TTL level, wherein the resistors R12, R32–35, R47, R54 and R55, and the capacitors C1–C5 are the exterior components that are coupled to the exterior part of the integrated circuit according to the invention.

Referring hereinafter to FIG. 2, the first inverter 1 comprises transistors Q1–Q7 and resistors R1–R11. The horizontal SYNC filter 2 comprises a resistor R7 and a capacitor C1. The first clamp circuit 3 comprises resistors R12 and R13, a transistor Q8 and a capacitor C2. The horizontal SYNC separator 4 comprises resistors R14–R16 and transistors Q9–Q11. The horizontal SYNC delay compensator 5 comprises transistors Q14–Q17 and Q24, resistors R17, R18, R24, and R33, and a capacitor C3. The horizontal SYNC output circuit 6 comprises transistors Q12 and Q13, and a resistor R32. The vertical SYNC filter 7 comprises transistors Q18 and Q23. The vertical SYNC filter 7 comprises transistors Q18 and Q23, resistors R19–R23 and R25, and a capacitor C4. The comparator 8 comprises transistors Q29 and Q30, and resistors R27–R29. The reference voltage generator 9 comprises resistors R30 and R31, and the vertical SYNC output circuit 10 comprises a transistor Q28 and a resistor R35. The composite SYNC output circuit 11 comprises transistors Q25–Q27 and resistors R26 and R34. The second inverter 12 comprises transistors Q31–Q37 and resistors R36–R46. The second clamp circuit 13 comprises a transistor Q38 and resistors R47 and R48. Finally, the burst gate pulse generator 14 comprises transistor Q36–Q46, resistors R49–R55 and a capacitor C5.

Figure 3:
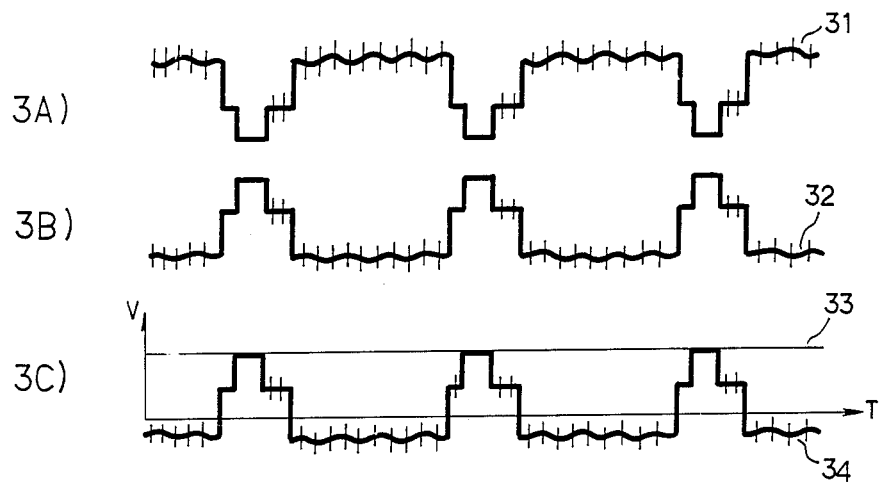
FIG. 3, A-C are waveform diagrams illustrating aspects of operation in a circuit portion for clamping the composite video signal according to the preferred embodiment.
Figure 5:
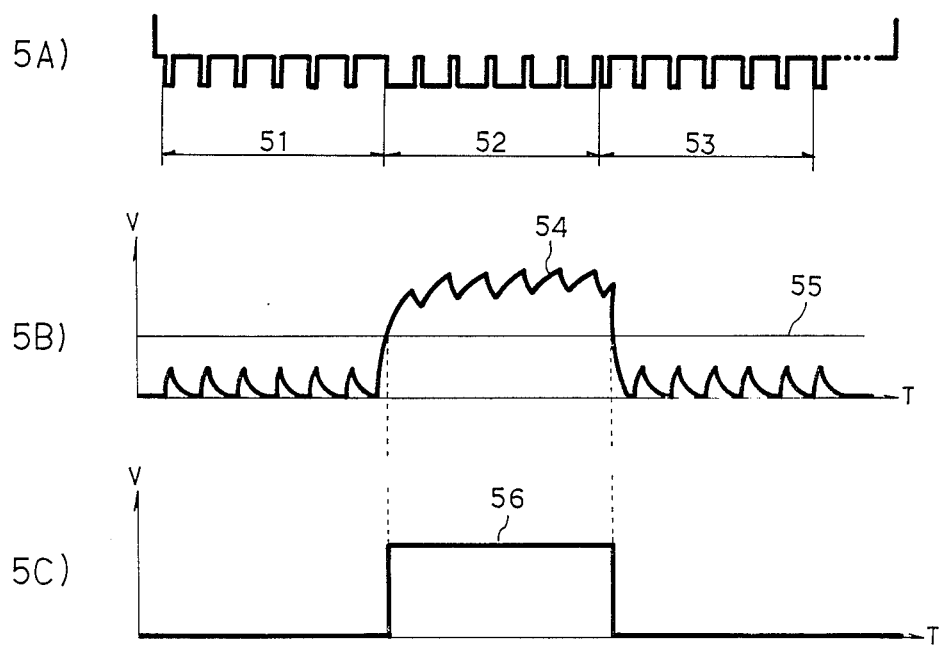
FIG. 5, A-C are waveform diagrams illustrating aspects of operation in a circuit portion for separating the vertical synchronizing signal according to the preferred embodiment.
Figure 7:
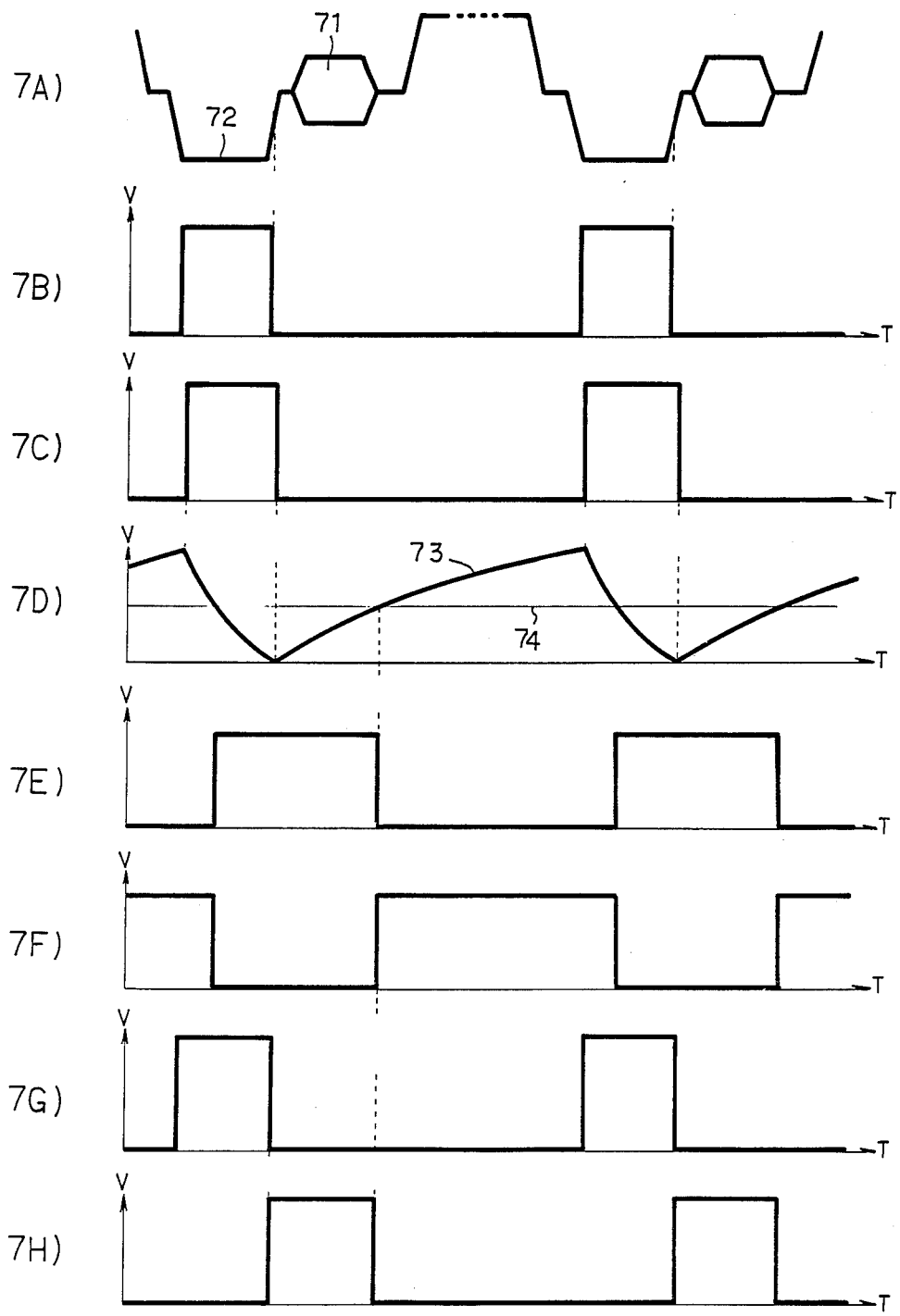
FIG. 7, A-H are waveform diagrams illustrating aspects of operation in a burst gate pulse generating circuit for providing the burst gate pulse signal according to the preferred embodiment.

Hereinafter, the operation in the aforementioned preferred embodiment according to the invention will be described in detail with reference to the waveforms of FIG. 3 to FIG. 7. First of all, FIGS. 3A–3C and FIGS. 4A–4F are referred to explain the operation of the circuit for providing the horizontal SYNC signal. If the positive composite video signal 31 through the input terminal IN as shown in FIG. 3A enters into the base of transistor Q1 in the first inverter 1, its inverted waveform 32 as shown in FIG. 3B is provided at the collector of transistor Q3. The inverted video signal 32 is delivered to the horizontal SYNC filter 2 and its high frequency component is removed therein. Then the output of the filter 2 is delivered to the base of transistor Q9 in the horizontal SYNC separator 4 through the first clamp circuit 3, in which said output is clamped to a fixed voltage level 33 as shown in FIG. 3C. When the clamped and inverted composite video signal 34 reaches to the clamping voltage level 33, that is, being in the horizontal SYNC period, the transistor Q9 turns ON. Thus, a waveform shown in FIG. 4C outputs from the collector of transistor Q9.

FIG. 4A also represents the received positive composite video signal, wherein a waveform 41 shows a burst signal and a waveform 42 shows a horizontal SYNC pulse, respectively. The signal of FIG. 4C, which is the collector output of the transistor Q9, is delivered to the horizontal SYNC separator 4 and the horizontal SYNC delay compensator 5, respectively. Consequently, said collector output of transistor Q9 becomes a waveform as shown in FIG. 4B, at the base of transistor Q12 in the horizontal SYNC output circuit 6, and also enters to the base of transistor Q16 in the horizontal SYNC delay compensator 5. If the collector output shown in FIG. 4C is LOW, the transistor Q16 turns OFF. Thus, the capacitor C3 charges having its time constant with the relation $\tau 1 = R33 \times C3$. When the charging voltage of the capacitor C3 reaches to a voltage that can afford to turn ON the transistor Q15 as shown in FIG. 4D, the transistor Q15 turns ON. If the signal of FIG. 4C changes its logic state from LOW to HIGH, the transistor Q16 turns ON and simultaneously the capacitor C3 begins to discharge as shown in FIG. 4D. Therefore, when the voltage of the capacitor C3 becomes lower than the turn-on voltage of the transistor Q15, the transistor Q15 changes its state from ON to OFF. A voltage level 43 shown in FIG. 4D represents the turn-on voltage of transistor Q15 and a waveform 44 therein represents the charging and discharging waveform of the capacitor C3. A waveform 45 shown in FIG. 4E represents an input signal in the base of transistor Q13, that is, the input of the horizontal SYNC output circuit 6. The horizontal SYNC output circuit 6 has a NOR gate comprising the transistor Q12 and Q13, and the resistor R32, wherein the horizontal SYNC signal compensated for the delay in the horizontal synchronization outputs through the output terminal $O_H$ when the signals shown in FIG. 4B and 4E are received thereto. Said horizontal SYNC output is shown in FIG. 4F.

Now, further to the aforementioned, FIGS. 5A–5C are referred to explain the operation of the circuit portion for providing the vertical SYNC signal. The collector output of the transistor Q9, as shown in FIG. 4C, is applied to the base of transistor Q18 in the vertical SYNC filter 7. When the signal of FIG. 4C is in a logic HIGH level, the transistor Q18 turns ON. When it is in a logic LOW level, said transistor Q18 turns OFF. Therefore, a reverse directional video signal that is inverted in phase with the base input of transistor Q18, is provided at the emitter of transistor Q21. FIG. 5A represents a vertical blanking period of the positive composite video signal input, wherein reference numeral 51 and 53 show equalizing pulse periods and other numeral 52 shows a vertical SYNC pulse period. If the negative video signal pass through the integrating circuit of the vertical SYNC filter comprising the resistor R25 and the capacitor C4, there is generated a waveform 54 having a higher voltage level than a reference voltage level 55 of the reference voltage generator 9 during only the vertical SYNC pulse period 52. There results in waveforms of FIG. 5B, in which the voltage level 55 represents the reference voltage of the reference voltage generator 9 and the waveform 54 represents the integration voltage of the vertical SYNC pulse period 52. The integration voltage is applied to the base of transistor Q29 in the comparator 8 and the reference voltage of the reference voltage generator 9 is also applied to the base of transistor Q30 therein. Accordingly, when the integration voltage 54 is higher than the reference voltage 55, which is the vertical SYNC pulse period, the transistor Q28 in the vertical SYNC output circuit 10 turns OFF and the vertical SYNC signal 56 of the TTL level is therefore outputed through the output terminal Ov. Said vertical SYNC output signal 56 is shown in FIG. 5C. Thus, from the positive composite video signal will be able to separate the vertical SYNC signal of high quality that the equalizing pulse and the horizontal SYNC pulse are excluded therein.

Next, FIGS 6A to 6D are further referred to describe the operation for generating the composite SYNC signal which is a signal composed of both the vertical SYNC signal and the compensated horizontal SYNC signal. The collector outputs of the transistor Q17 in the horizontal SYNC delay compensator 5 and the transistor Q9 in the horizontal SYNC separator 4 are both applied to the circuitry comprising the transistor Q24 and the resistor R24 of the horizontal SYNC delay compensator. That is, to the base of transistor Q25 in the compsite SYNC output circuit 11 is applied a waveform shown in FIG. 6B. Another input to the composite SYNC output circuit 11, which is the vertical SYNC signal, is applied to the base of transistor Q27 therein from the collector of transistor Q30 in the comparator 8. A waveform of FIG. 6A is same to that of FIG. 5A. Because the transistors Q25, Q26 and Q27, and the resistors R26 and R34 in the composite SYNC output circuit 11 form an OR gate, the waveforms of FIG. 6B and 6C are ORed therein. Thus, the waveform of FIG. 6D results from the OR operation, which is the composite SYNC signal composed of the horizontal and vertical SYNC signals. Said composite SYNC signals outputs with TTL level through the output terminal Oc. The waveform shown in FIG. 6C represent the vertical SYNC signal applied to the base of transistor Q27.

Further referring to FIG. 7A to 7H, there will be described in detail for the operation in the burst gate pulse generator 14. The compensated horizontal SYNC signal is applied to the second inverter 12. FIG. 7A shows the identical waveform to that of FIG. 4A and FIG. 7B shows the compensated horizontal SYNC signal which is identical to that of FIG. 4F. The horizontal SYNC input applied to the second inverter 12 is inverted in phase at the collector output of transistor Q33, and then clamped to a fixed voltage level through the second clamp circuit 13. From the collector of transistor Q39 in the burst gate pulse generator 14 is supplied a waveform of FIG. 7C which slightly delays in phase than that of FIG. 7B. The collector output of transistor Q39 in the burst gate pulse generator 14 is applied to the bases of transistor Q40 and transistor Q46, and the waveform applied to the base of transistor Q40 results in a waveform of FIG. 7G at the base of transistor Q42. If the signal of FIG. 7C applied to the base of transistor Q46 is in logic LOW LEVEL, the transistor Q46 turns OFF and then the capacitor C5 begins to charge with its time consiant $\tau 2$ ($=R55 \times C5$). When the charging voltage of the capacitor C5 reaches to a voltage that can afford to turn ON the transistor Q45, the transistor Q45 becomes to turn ON. If the signal of FIG. 7C changes its state to a ligic HIGH level, the transistor Q46 also changes its state from OFF to ON and the capacitor begins to discharge. When the discharging voltage of the capacitor C5 becomes lower than the turn ON voltage of the transistor Q45, the transistor Q45 turns OFF and consequently a waveform shown in FIG. 7E results through the collector of transistor Q45. Therein, the waveform 73 of FIG. 7D represents the charging and discharging waveform in the capacitor C5, the waveform 74 thereof represents the turn ON voltage. Therefore, from the collector of transistor Q44 is supplied the waveform shown in FIG. 7F. The transistors Q42 and Q43, and the resistor R54 maks a single NOR gate, in which two input waveforms respectively shown in FIG. 7F and 7G results in the waveform of FIG. 7H that is the burst gate pulse having a stability and quality through the output terminal $O_G$ thereof.

As described in aforementioned, there are provided the burst gate pulse of high quality in addition to the horizontal SYNC signal, vertical SYNC signal and the composite SYNC signal in accordance with the present invention. Because the composite video signal is used as an input and the SYNC signals are separated therefrom, the problems in synchronization of signals will be able to be improved in the video system. Moreover, as the burst gate pulse are provided therefrom, it will be possible to achieve the size reduction of exterior circuit and attain the stabilized burst gate pulse. Therefore, the invention has the advantages that saves in the production cost and achieves an improved and accurate digital video system.

While the invention has been particularly shown and described with reference to a preferred embodiment, it will be well understood by those skilled in the art that modifications in detail may be made without departing from the spirit and scope of the invention.

What is claimed is:

1. An integrated circuit for supplying a burst gate pulse in addition to a horizontal synchronizing signal, a vertical synchronizing signal and a composite synchronizing signal being separated from a composite video signal input, comprising:
    a first inverter for inverting in phase a composite video signal input;
    a horizontal synchronizing filter for eliminating a high frequency component from output of said first inverter forming an inverted composite video signal;
    a first clamp circuit for clamping output of said horizontal synchronizing filter to a fixed voltage to ease separation of a horizontal synchronizing signal therefrom;
    horizontal synchronizing separation means for separating the horizontal synchronizing signal from clamped output of said first clamp circuit;
    horizontal synchronizing delay compensation means for compensating delay of said clamped output;
    horizontal synchronizing output means for receiving the horizontal synchronizing signal from said horizontal synchronizing separation means and the compensated output of said horizontal synchronizing delay means, and thereby supplying the horizontal synchronizing signal having a specified level;
    a vertical synchronizing filter for eliminating the horizontal synchronizing signal and an equalizing pulse from the clamped output of said first clamp signal;
    a comparator for comparing the output of said vertical synchronizing filter with a reference voltage and thereby separating a vertical synchronizing signal;
    reference voltage generating means for supplying said reference voltage to said comparator;
    vertical synchronizing output means for receiving said vertical synchronizing signal and therefrom supplying the vertical synchronizing signal having a specified level;
    composite synchronizing output means for supplying a composite synchronizing signal having a specified level by composing said vertical synchronizing signal of said comparator and the compensated horizontal synchronizing signal;
    a second inverter for inverting in phase said horizontal synchronizing signal of said horizontal synchronizing output means;
    a second clamp circuit for clamping the inverted horizontal synchronizing signal of said second inverter to a fixed voltage; and
    burst gate pulse generating means for supplying a burst gate pulse from the clamped horizontal synchronizing signal of said second clamp circuit.

* * * * *